(12) United States Patent
Imamura

(10) Patent No.: US 7,944,437 B2
(45) Date of Patent: May 17, 2011

(54) INFORMATION PROCESSING APPARATUS AND TOUCH PAD CONTROL METHOD

(75) Inventor: Akira Imamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1211 days.

(21) Appl. No.: 11/603,208

(22) Filed: Nov. 22, 2006

(65) Prior Publication Data

US 2007/0126714 A1    Jun. 7, 2007

(30) Foreign Application Priority Data

Dec. 7, 2005  (JP) ................................. 2005-353660

(51) Int. Cl.
*G06F 3/042* (2006.01)

(52) U.S. Cl. ..... 345/175; 345/156; 345/173; 178/18.01; 178/18.03; 178/18.11

(58) Field of Classification Search .................. 345/156, 345/157, 163, 168, 173; 178/18.01, 18.03, 178/18.11
See application file for complete search history.

(56) References Cited

U.S. PATENT DOCUMENTS

| | | | | |
|---|---|---|---|---|
| 5,231,698 | A * | 7/1993 | Forcier | 715/273 |
| 5,475,401 | A * | 12/1995 | Verrier et al. | 345/179 |
| 5,793,361 | A * | 8/1998 | Kahn et al. | 345/179 |
| 5,914,783 | A * | 6/1999 | Barrus | 356/614 |
| 6,061,051 | A * | 5/2000 | Chan et al. | 345/173 |
| 6,292,179 | B1 * | 9/2001 | Lee | 345/173 |
| 6,388,660 | B1 * | 5/2002 | Manser et al. | 345/173 |
| 6,405,061 | B1 * | 6/2002 | Bae | 455/566 |
| 6,714,310 | B1 * | 3/2004 | Tanaka et al. | 356/614 |
| 7,180,510 | B2 * | 2/2007 | Inoue et al. | 345/180 |
| 7,352,364 | B2 * | 4/2008 | Wang | 345/173 |
| 2006/0026521 | A1 * | 2/2006 | Hotelling et al. | 715/702 |
| 2006/0026535 | A1 * | 2/2006 | Hotelling et al. | 715/863 |
| 2007/0182595 | A1 * | 8/2007 | Ghasabian | 341/22 |

FOREIGN PATENT DOCUMENTS

| | | |
|---|---|---|
| JP | 06-274272 | 9/1994 |
| JP | 09-190256 | 7/1997 |
| JP | 2000-339097 | 12/2000 |
| JP | 2003-248550 A | 9/2003 |
| JP | 2004-70379 A | 3/2004 |
| JP | 2004-199516 A | 7/2004 |

OTHER PUBLICATIONS

Japanese Office Action dated Apr. 15, 2008 for Appln. No. 2005-353660.

* cited by examiner

*Primary Examiner* — My-Chau T Tran
(74) *Attorney, Agent, or Firm* — Pillsbury Winthrop Shaw Pittman, LLP

(57) ABSTRACT

According to one embodiment, an information processing apparatus includes a main body, a touch pad which is provided on the main body, a determination unit which determines whether an external pointing device is connected to the main body, and a control unit which controls the touch pad in one of a first mode for making the touch pad function as a pointing device and a second mode in which in response to tapping of one of a plurality of virtual buttons disposed on a surface of the touch pad, a function which is assigned to the tapped virtual button is activated, the control unit controlling the touch pad in the second mode if the external pointing device is connected to the main body.

10 Claims, 8 Drawing Sheets

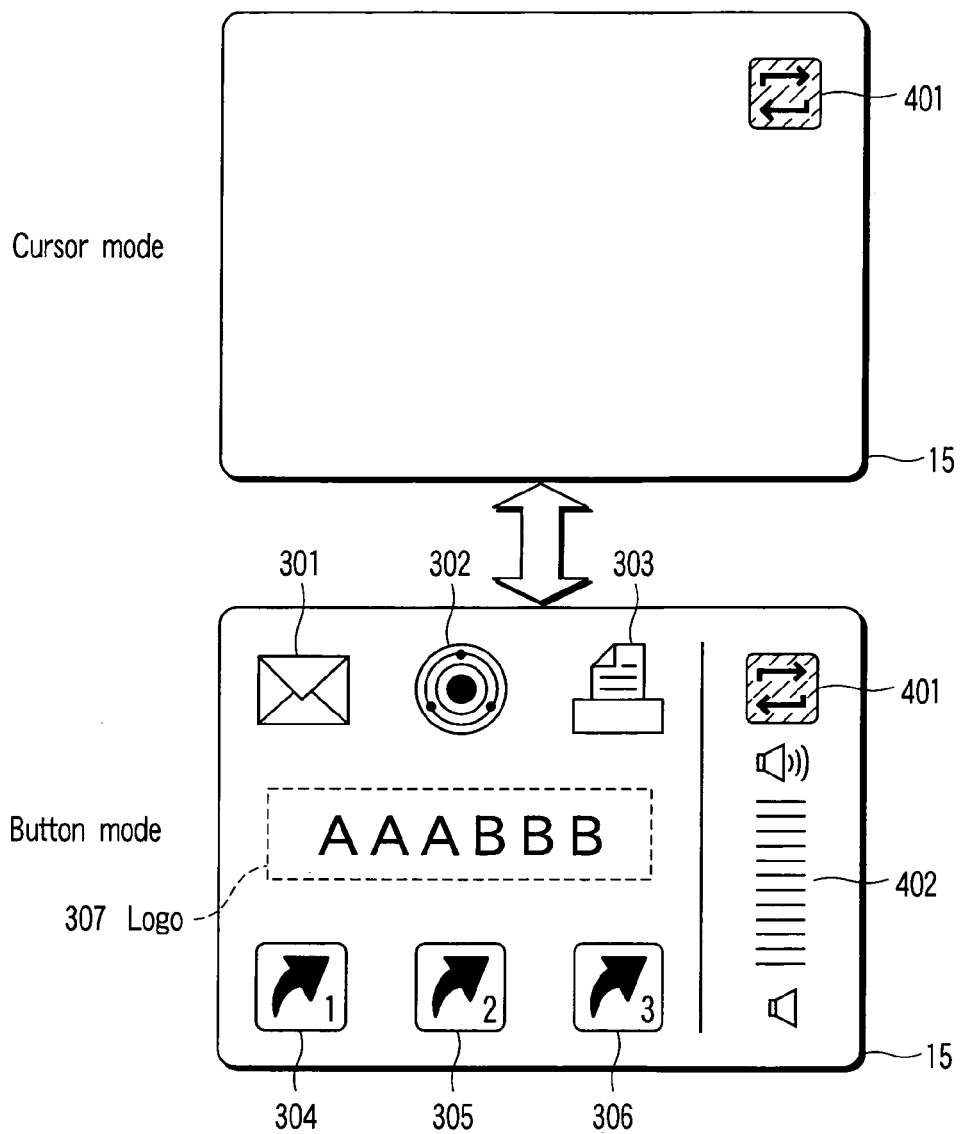
F I G. 3
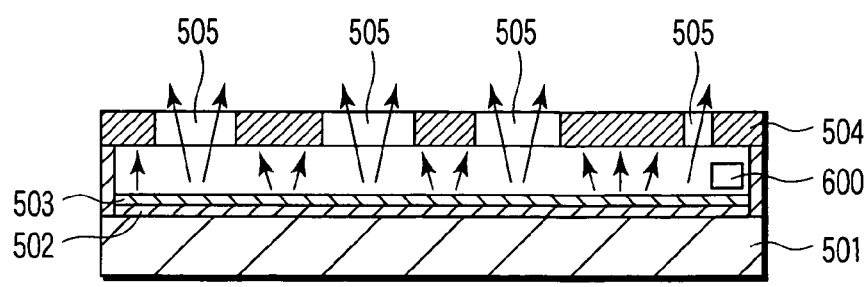
F I G. 4

INFORMATION PROCESSING APPARATUS AND TOUCH PAD CONTROL METHOD

CROSS-REFERENCE TO RELATED APPLICATIONS

This application is based upon and claims the benefit of priority from Japanese Patent Application No. 2005-353660, filed Dec. 7, 2005, the entire contents of which are incorporated herein by reference.

BACKGROUND

1. Field

One embodiment of the invention relates to an information processing apparatus such as a personal computer, and a touch pad control method for use in the apparatus.

2. Description of the Related Art

In recent years, various types of notebook portable personal computers have been developed. Most of these types of computers have touch pads functioning as pointing devices. The user can perform a pointing operation, such as movement of a cursor (mouse pointer), by operating the touch pad by the finger.

Jpn. Pat. Appln. KOKAI Publication No. 2003-248550 discloses a touch pad including a display device like a liquid crystal display (LCD). A tap zone is provided on the surface of the touch pad. If the tap zone is tapped by the user, a function corresponding to the tap zone is activated. If a region, other than the tap zone, on the surface of the touch pad is touch-operated by the user, a mouse pointing function is executed. In addition, the touch pad has a function of displaying wallpaper, and a function of displaying icon corresponding to function which is assigned to the tap zone on the surface of the touch pad.

In the touch pad of Jpn. Pat. Appln. KOKAI Publication No. 2003-248550, however, a specific area on the surface of the touch pad is used as a tap zone, and the other area is used as an area for pointing operations. It is thus possible that the user may erroneously touch the tap zone while performing a pointing operation, and a function which is not intended by the user may be activated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary view for explaining two modes for controlling a touch pad that is provided on the computer shown in FIG. 1;

FIG. 4 is an exemplary cross-sectional view showing a cross-sectional structure of the touch pad provided on the computer shown in FIG. 1;

DETAILED DESCRIPTION

Various embodiments according to the invention will be described hereinafter with reference to the accompanying drawings. In general, according to one embodiment of the invention, an information processing apparatus includes: a main body; a touch pad which is provided on the main body; a determination unit which determines whether an external pointing device is connected to the main body; and a control unit which controls the touch pad in one of a first mode for making the touch pad function as a pointing device and a second mode in which in response to tapping of one of a plurality of virtual buttons disposed on a surface of the touch pad, a function which is assigned to the tapped virtual button is activated, the control unit controlling the touch pad in the second mode if the external pointing device is connected to the main body.

Figure 1:
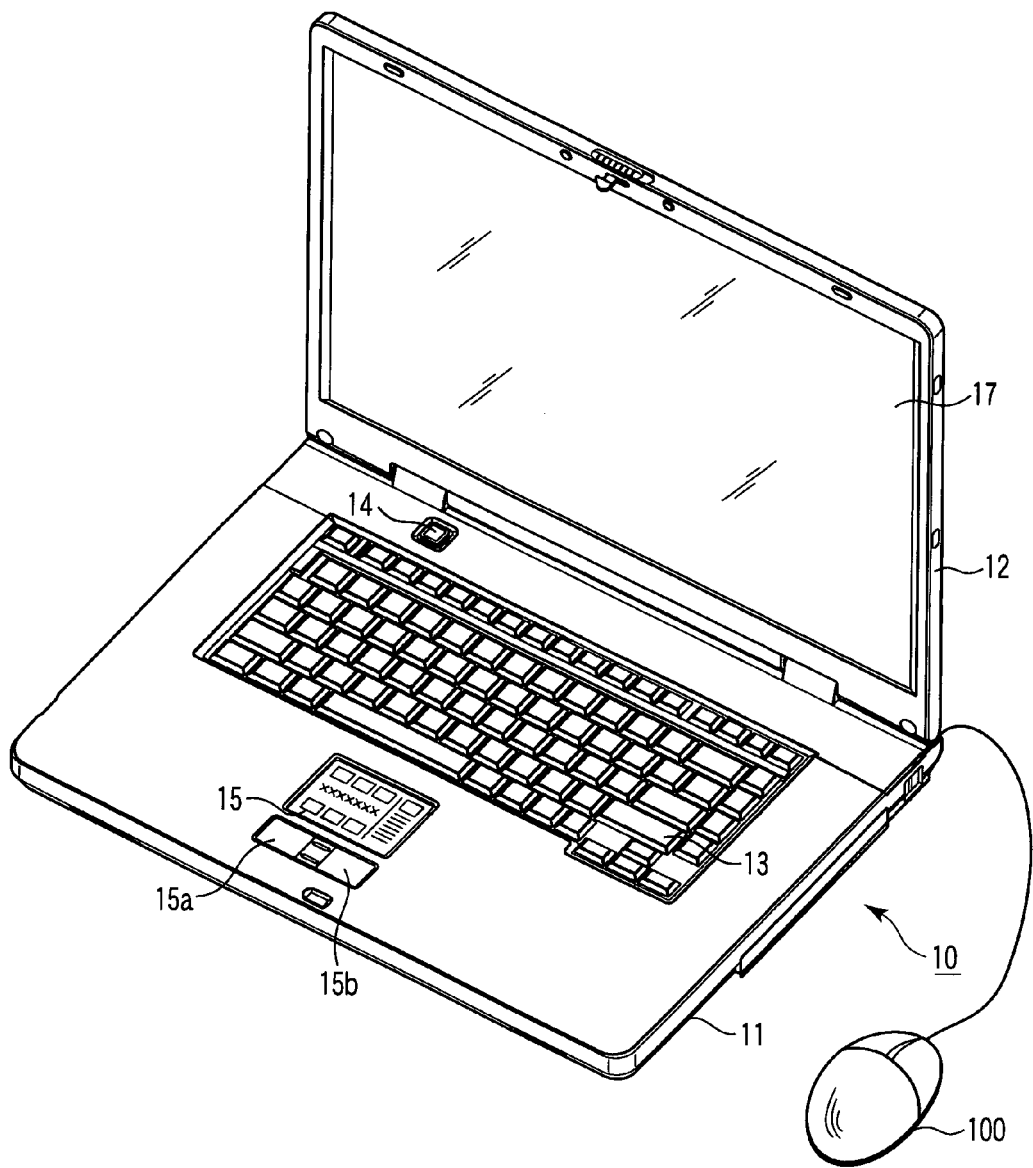
FIG. 1 is an exemplary perspective view showing an example of the external appearance of a computer according to an embodiment of the present invention.
Figure 2:
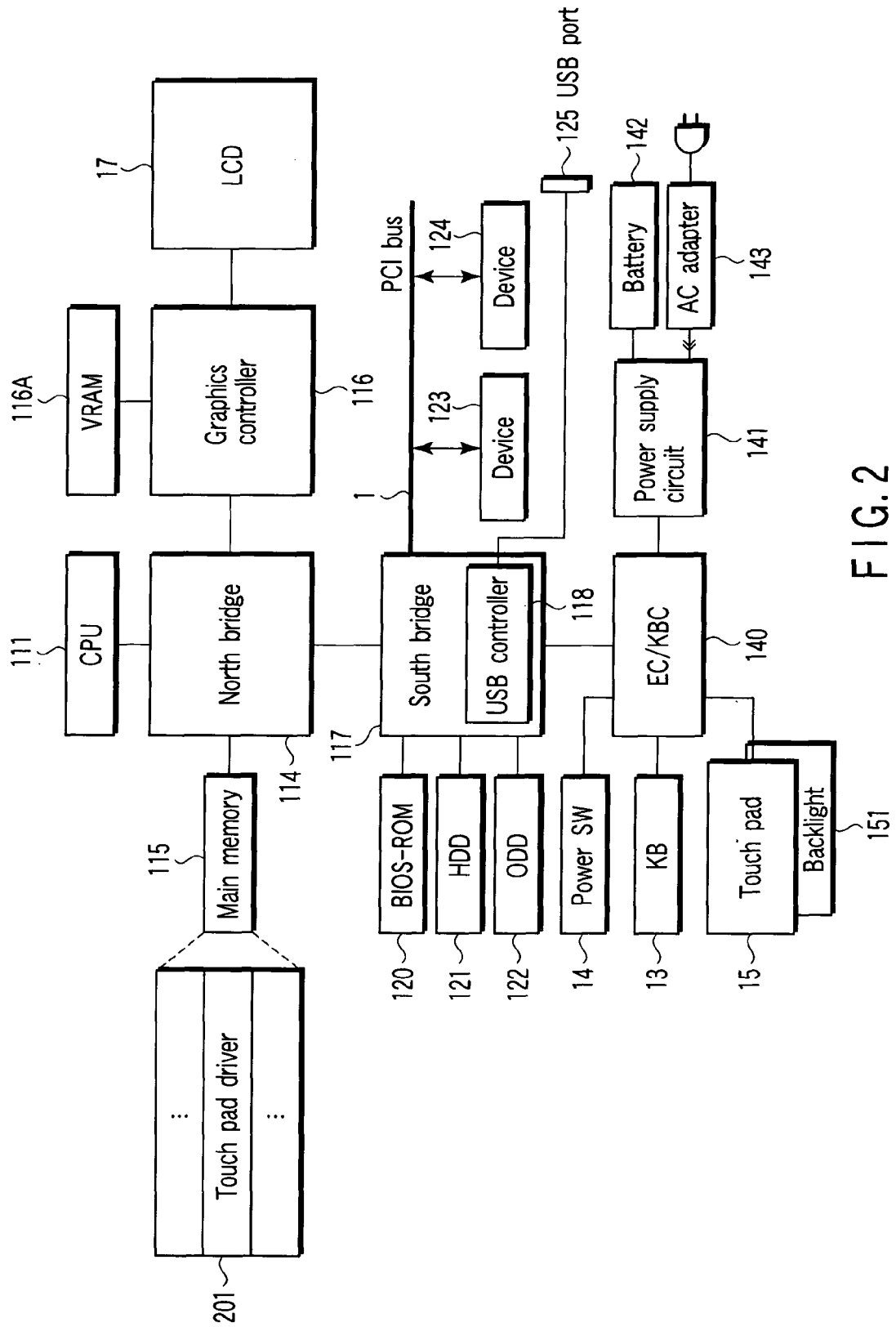
FIG. 2 is an exemplary block diagram showing a system configuration of the computer shown in FIG. 1.

Referring to FIG. 1 and FIG. 2, the structure of an information processing apparatus according to the embodiment of the invention is described. The information processing apparatus is realized, for example, as a battery-powerable notebook-type portable personal computer 10.

FIG. 1 is a perspective view showing the computer 10 in the state in which a display unit thereof is opened. The computer 10 comprises a main body (hereinafter referred to as "computer main body") 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing in which a battery can detachably be attached.

A keyboard 13, a power button switch 14 for powering on/off the computer 10, a touch pad 15, a left button 15a and a right button 15b are disposed on the top surface of the computer main body 11. The touch pad 15 is a device which functions as a pointing device. In the present embodiment, the following two modes are provided as modes for controlling the touch pad 15.

(1) First Mode (Cursor Mode)

A first mode (cursor mode) is a mode for making the touch pad 15 function as an ordinary pointing device. In the first mode (cursor mode), the touch pad 15 functions the pointing device such as a mouse device, a user can perform pointing operations, such as movement of a cursor (mouse pointer) and a click operation, by moving the finger on the surface of the touch pad 15 or by tapping the surface of the touch pad 15 at an arbitrary position by the finger.

(2) Second Mode (Button Mode)

A second mode (button mode) is a mode in which when one of a plurality of virtual buttons disposed on the surface of the touch pad 15 is touch-operated, a function which is assigned to the touch-operated virtual button is activated. Each virtual button functions as a shortcut key for activating the associated function. In the second mode (button mode), simply by tapping a virtual button, the user can easily activate the function corresponding to the tapped virtual button.

The touch pad 15 includes a surface sheet and a light source (backlight) which is provided on the back side of the surface sheet. The surface sheet has a plurality of light-transmissive areas which have shapes corresponding to the virtual buttons and pass light that is emitted from the light source. Thus, when the light source (backlight) is turned on, light is passed from the plural light-transmissive areas of the surface sheet. Thereby, the shapes corresponding to the plural virtual buttons are displayed on the surface of the touch pad 15. When the light source (backlight) is turned off, the plural virtual buttons become hardly visible.

In the second mode (button mode), the light source (backlight) is turned on. In the first mode (cursor mode), the light source (backlight) is turned off.

An external pointing device 100 can be connected, as needed, to the computer main body 11. The external pointing device 100 is, for example, a mouse device. When the external pointing device 100 is connected to the computer main body 11, the mode for controlling the touch pad 15 is automatically set to the second mode (button mode). The user can execute the pointing operation by using the external pointing device 100, and can use the virtual buttons on the touch pad 15 as shortcut keys.

FIG. 2 shows an example of the system configuration of the computer 10.

The computer 10, as shown in FIG. 2, comprises a CPU 111, a north bridge 114, a main memory 115, a graphics controller 116, a south bridge 117, a BIOS-ROM 120, a hard disk drive (HDD) 121, an optical disc drive (ODD) 122, various PCI (Peripheral Component Interconnect) devices 123, 124, an embedded controller/keyboard controller IC (EC/KBC) 140, and a power supply circuit 141.

The CPU 111 is a processor that is provided for controlling the operation of the computer 10. The CPU 111 executes an operating system and various application programs/utility programs, which are loaded in the main memory 115 from the HDD 121. One of the utility programs is a touch pad driver 201. The touch pad driver 201 is a program for controlling the touch pad 15. The touch pad driver 201 controls the touch pad 15 in one of the first mode (cursor mode) and the second mode (button mode).

The CPU 111 also executes a system BIOS (Basic Input/Output System) that is stored in the BIOS-ROM 120. The system BIOS is a program for hardware control.

The north bridge 114 is a bridge device that connects a local bus of the CPU 111 and the south bridge 117. The north bridge 114 includes a memory controller that access-controls the main memory 115. The north bridge 114 has a function of executing communication with the graphics controller 116 via, e.g. a PCI Express bus.

The graphics controller 116 is a display controller for controlling the LCD 17 that is used as a display monitor of the computer 10. The graphics controller 116 includes a video memory (VRAM) 116A and generates a video signal, which forms a display image to be displayed on the LCD 17, on the basis of display data that is written in the video memory (VRAM) 116A by the OS/application program.

The south bridge 117 is connected to a PCI bus 1 and executes communication with the PCI devices 123 and 124 via the PCI bus 1. The south bridge 117 includes an IDE (Integrated Drive Electronics) controller or a Serial ATA controller for controlling the hard disk drive (HDD) 121 and optical disc drive (ODD) 122. Further, the south bridge 117 includes a USB (Universal Serial Bus) controller 118. The USB controller 118 controls various USB devices which are connectable to a USB port 125 provided on the computer main body 11. A USB device, for instance, is usable as the above-mentioned external pointing device 100.

The embedded controller/keyboard controller IC (EC/KBC) 140 is a 1-chip microcomputer in which an embedded controller for power management and a keyboard controller for controlling the keyboard (KB) 13 and touch pad 15 are integrated. The EC/KBC 140 has a function of powering on/off the computer 10 in response to the user's operation of the power button switch 14. The power on/off control of the computer 10 is executed by cooperation of the EC/KBC 140 and power supply circuit 141.

The touch pad 15 includes a backlight 151, as described above. The touch pad 15 is connected to a keyboard controller within the EC/KBC 140 via, e.g. a PS/2 interface.

The power supply circuit 141 uses power from a battery 142 which is mounted in the computer main body 11 or power from an AC adapter 143 which is connected to the computer main body 11 as the external power supply, thereby generating operational powers to the respective components.

Next, referring to FIG. 3, the buttons disposed on the touch pad 15 are described.

As shown in FIG. 3, six virtual buttons 301, 302, 303, 304, 305 and 306 are disposed on the surface of the touch pad 15. Applications programs or files may be assigned to these virtual buttons.

Functions are pre-assigned to the three virtual buttons 301, 302 and 303 which are disposed on the upper side of the surface of the touch pad 15. Thereby, the virtual buttons 301, 302 and 303 can function as shortcut keys for activating, for instance, frequently used application programs.

The virtual button 301 functions, for example, as a shortcut key for activating e-mail software. The virtual button 302 functions, for example, as a shortcut key for activating a utility or internet browser for controlling network connection. The virtual button 303 functions, for example, as a shortcut key for activating a printing function for sending an item in an active window on the display screen of the LCD 17 to a printer.

The user can assign arbitrary application programs or files to the three virtual buttons 304, 305 and 306 disposed on lower side of the surface of the touch pad 15, by using a GUI which is displayed on the LCD 17 by the touch pad driver 201. In the meantime, the user can also assign arbitrary application programs or files to the upper-side three virtual buttons 301, 302 and 303 by using the GUI which is displayed on the LCD 17 by the touch pad driver 201.

In a case where a specific sound file is assigned to one of the virtual buttons, when the user taps this virtual button, sound reproduction software is activated and the reproduction of the specific sound file is automatically started.

A logo 307, which indicates, for instance, the name of the manufacturer of the computer 10 and the brand name of the computer 10, is disposed on an area between the upper-side three virtual buttons 301, 302 and 303 and the lower-side three virtual buttons 304, 305 and 306, that is, a central area on the surface of the touch pad 15.

A mode switch button 401 is disposed on an upper right corner of the surface of the touch pad 15. The mode switch button 401 is a button for switching the mode for controlling the touch pad 15 from the first mode (cursor mode) to the second mode (button mode). The mode switch button 401 is always presented even in the case where the backlight 151 is turned off, that is, even in the first mode (cursor mode).

A virtual button (volume controller) 402, to which a function of controlling a sound volume is assigned, is disposed under the mode switch button 401.

In the first mode (cursor mode), the backlight 151 is turned off. Accordingly, only the mode switch button 401 is presented on the surface of the touch pad 15. On the other hand, in the second mode (button mode), light of, e.g. blue, which is emitted from the backlight 151, is passed to the outside through the light-transmissive areas corresponding to the shapes of the six virtual buttons 301 to 306, log 307, mode switch button 401 and volume controller 402. Thereby, the shapes of the six virtual buttons 301 to 306, log 307, mode switch button 401 and volume controller 402 are presented on the surface of the touch pad 15 with blue light.

FIG. 4 shows an example of the cross-sectional structure of the touch pad 15.

A surface sheet 504, as described above, includes a number of light-transmissive areas 505 corresponding to the shapes of the six virtual buttons 301 to 306, log 307, mode switch button 401 and volume controller 402. A sensor layer 502 for detecting a position on the surface of the touch pad 15, at which the touch pad 15 is touched by the user's finger, is disposed under the surface sheet 504. The sensor layer 502 is formed on an insulating substrate 501. A reflective layer 503 for reflecting light from a light source 600, such as a blue LED, is formed on the sensor layer 502. The light source 600 and reflective layer 503 function as the above-described backlight 151.

Figure 5:
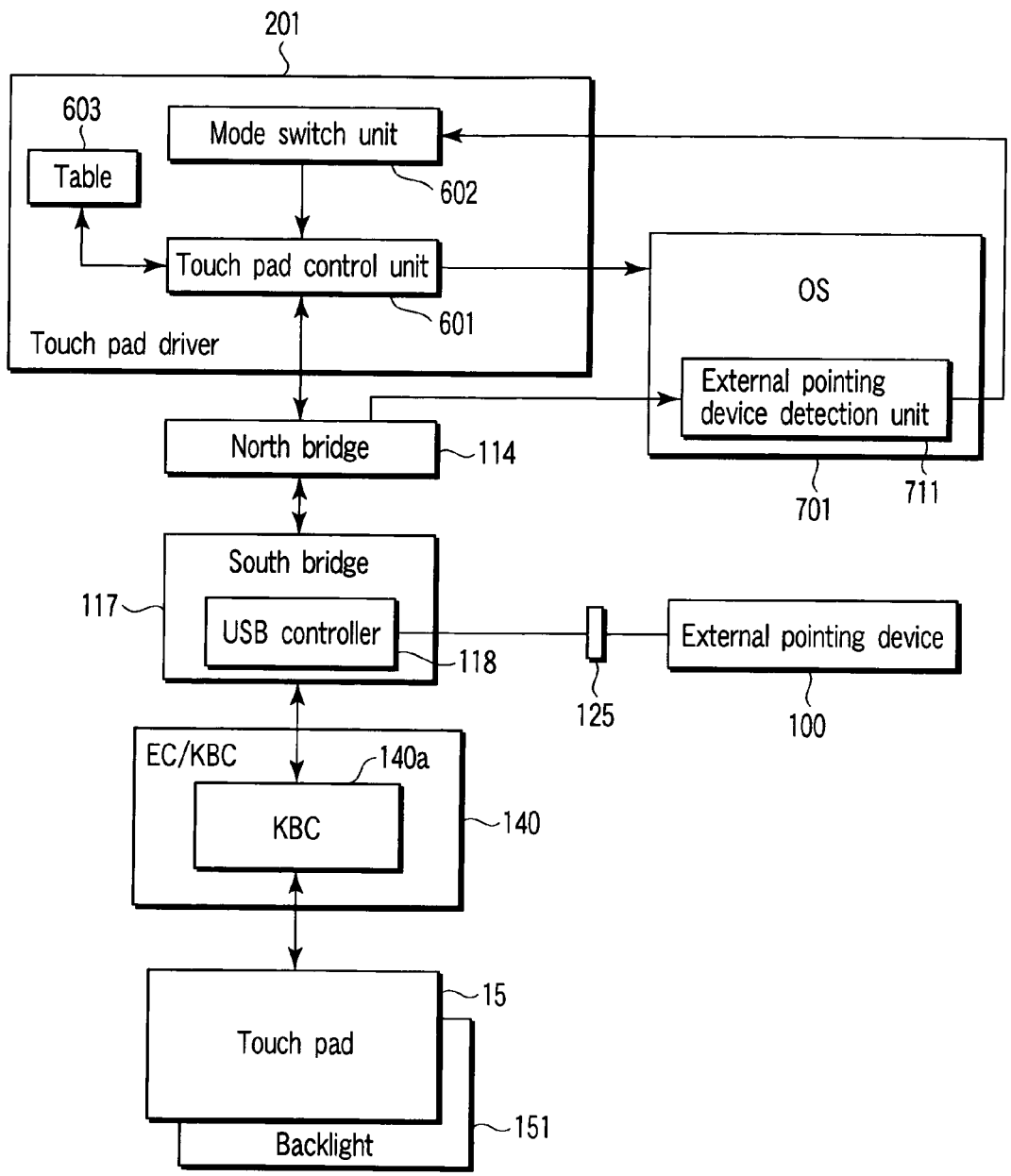
FIG. 5 is an exemplary view for showing an example of the hardware/software configuration for controlling the touch pad provided on the computer shown in FIG. 1.

Next, referring to FIG. 5, a hardware/software configuration for controlling the touch pad 15 is described.

The touch pad 15 is connected to a keyboard controller (KBC) 140a in the EC/KBC 140 via, e.g. a PS/2 interface. In each of the first mode (cursor mode) and second mode (button mode), the touch pad 15 sends to the keyboard controller (KBC) 140a coordinate data indicative of a position on the surface of the touch pad 15, at which the touch pad 15 is touched by the user. The coordinate data is sent to the touch pad driver 201, which runs on the CPU 111, via the south bridge 117 and the north bridge 114.

The touch pad driver 201 includes, as its functional modules, a touch pad control unit 601 and a mode switch unit 602. The touch pad control unit 601 is a control unit which controls the touch pad 15 in one of the first mode (cursor mode) and second mode (button mode). That is, the touch pad control unit 601 operates in one of the first mode (cursor mode) and second mode (button mode) in order to control the touch pad 15.

In the first mode (cursor mode), the touch pad control unit 601 sends information indicative of the position of cursor movement to an operating system (OS) 701, in accordance with the coordinate data from the touch pad 15. In addition, in the first mode (cursor mode), the touch pad control unit 601 determines whether a tap position is in a zone in which the mode switch button 401 is disposed, in accordance with the coordinate data from the touch pad 15. If the tap position is in the zone in which the mode switch button 401 is disposed, the touch pad control unit 601 switches its operation mode from the first mode (cursor mode) to the second mode (button mode). At this time, the touch pad control unit 601 sends to the touch pad 15 a command for instructing turn-on of the backlight 151 (turn-on of the light source 600).

In the second mode (button mode), the touch pad control unit 601 determines which of the virtual buttons 301 to 306 and volume controller 402 is tapped, in accordance with the coordinate data from the touch pad 15. The touch pad control unit 601 instructs the OS 701 to activate the function corresponding to the tapped virtual button or volume controller. A table 603 stores information indicating the relationship between the coordinate information of the zones, which correspond to the virtual buttons 301 to 306 and the volume controller 402, and the functions which are assigned to the virtual buttons 301 to 306 and the volume controller 402. Referring to the table 603, the touch pad control unit 601 executes a process of determining which of the virtual buttons 301 to 306 and the volume controller 402 is tapped, and a process of determining the function to be activated.

The OS 701 includes an external pointing device detection unit 711 as one of its functional modules. The external pointing device detection unit 711 is a determination unit for determining whether the external pointing device 100 is connected to the computer main body 11. When the external pointing device 100 is connected to the USB port 125, the USB controller 118 informs the OS 701 of an event indicating connection of the external pointing device 100 to the USB port 125. Thereby, the external pointing device detection unit 711 of the OS 701 can detect that the external pointing device 100 is connected to the computer main body 11. When the external pointing device 100 is connected to the computer main body 11, the external pointing device detection unit 711 activates a driver (e.g. a mouse driver) for controlling the external pointing device 100, and informs the mode switch unit 602 of the touch pad driver 201 that the external pointing device 100 is connected to the computer main body 11. Responding to the information, the mode switch unit 602 switches the operation mode of the touch pad control unit 601 from the first mode (cursor mode) to the second mode (button mode).

The external pointing device detection unit 711 also detects disconnection of the external pointing device 100 from the computer main body 11. The external pointing device detection unit 711 informs the mode switch unit 602 of the touch pad driver 201 that the external pointing device 100 is disconnected from the computer main body 11. Responding to the information, the mode switch unit 602 switches the operation mode of the touch pad control unit 601 from the second mode (button mode) to the first mode (cursor mode).

Figure 6:
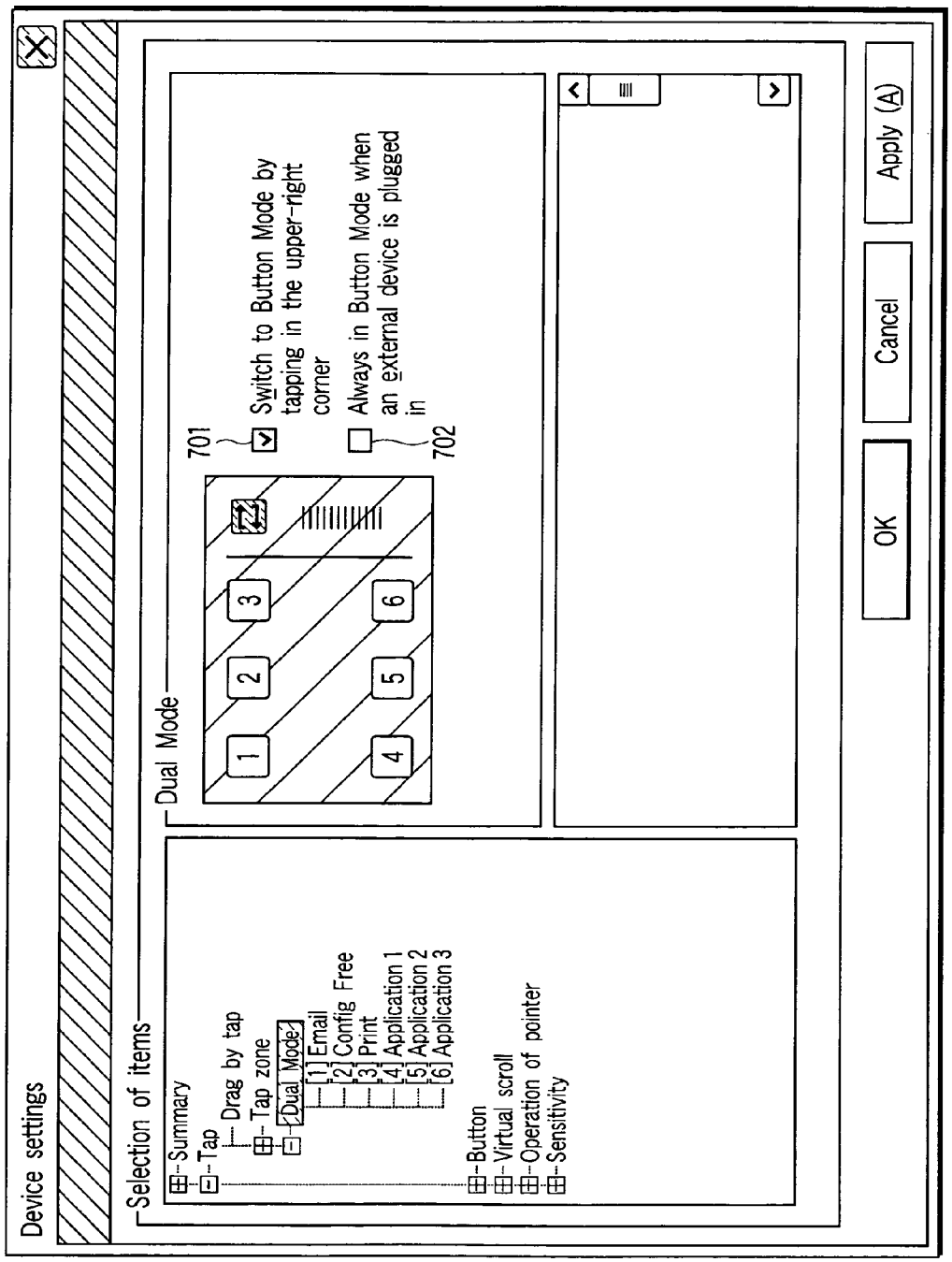
FIG. 6 is an exemplary view showing an example of a setup screen for use in the computer shown in FIG. 1.

FIG. 6 shows an example of a setup screen which is displayed on the LCD 17 by the touch pad driver 201.

On the setup screen, setting items relating to the setting of a dual mode are prepared. The dual mode is a mode for permitting switching from the first mode (cursor mode) to the second mode (button mode) when the mode switch button 401 is tapped. If a check box 701 at an upper right area on the setup screen is checked by the user, the dual mode is rendered effective. If a button on the surface of the touch pad 15 is tapped in the second mode (button mode), the function corresponding to the tapped button is executed and then the switching to the first mode (cursor mode) is automatically executed.

Another check box 702 is provided on the setup screen. If the check box 702 is checked by the user, the above-described function (hereinafter referred to as "auto-mode"), in which the first mode (cursor mode) is switched to the second mode (button mode) when the external pointing device 100 is connected to the computer main body 11, is rendered effective. In the case where the auto-mode is effective, while the external pointing device 100 is connected to the computer main body 11, the touch pad 15 is always controlled in the second mode (button mode). If an arbitrary button on the surface of the touch pad 15 is tapped, the function corresponding to the tapped button is executed but the switching to the first mode (cursor mode) is not executed. Thus, the control mode of the touch pad 15 is always kept in the second mode (button mode).

Figure 7:
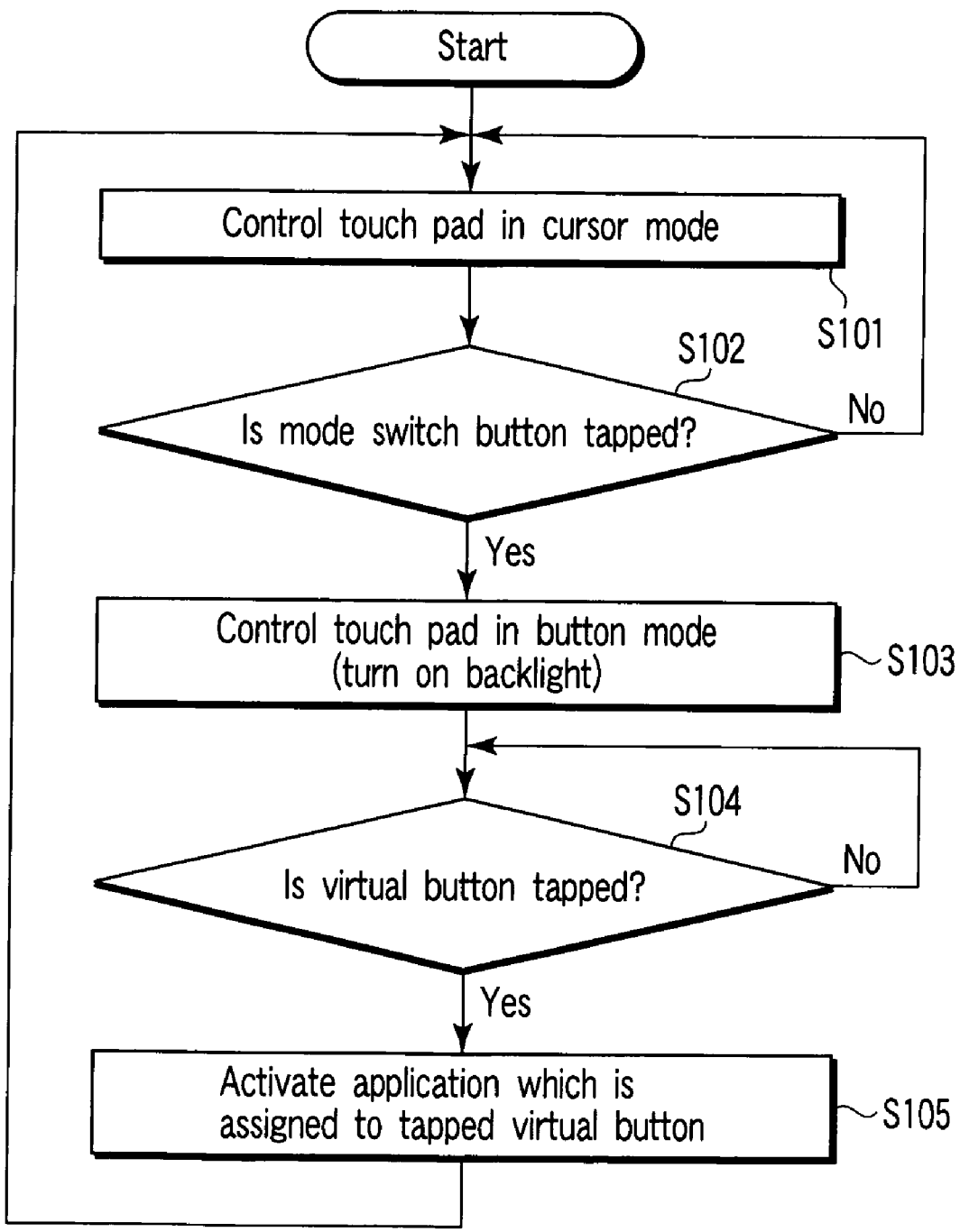
FIG. 7 is an exemplary flow chart illustrating an example of the procedure of a dual mode control process which is executed by the computer shown in FIG. 1.

Next, referring to a flow chart of FIG. 7, a description is given of an example of a process procedure which is executed by the touch pad driver 201 when the dual mode is effective.

To start with, the touch pad driver 201 controls the touch pad 15 in the first mode (cursor mode) (block S101). If the mode switch button 401 is tapped by the user in the first mode (YES in block S102), the touch pad driver 201 sends to the touch pad 15 a command for instructing turn-on of the backlight 151, thus turning on the backlight 151, and switches the control mode of the touch pad 15 to the second mode (button mode), thus controlling the touch pad 15 in the second mode (button mode) (block S103).

If one of the virtual buttons 301 to 306 and 402 is tapped (YES in block S104), the touch pad driver 201 cooperates with the OS 701 and activates the function (e.g. application program) which is assigned to the tapped virtual button (block S105). After the function assigned to the tapped virtual button is activated, the touch pad driver 201 sends to the touch pad 15 a command for instructing turn-off of the backlight 151, thus turning off the backlight 151, and switches the control mode of the touch pad 15 to the first mode (cursor mode), thus controlling the touch pad 15 in the first mode (cursor mode) (block S101). Using the touch pad 15, the user can perform a pointing operation to designate an arbitrary position on the window of the activated application program.

Figure 8:
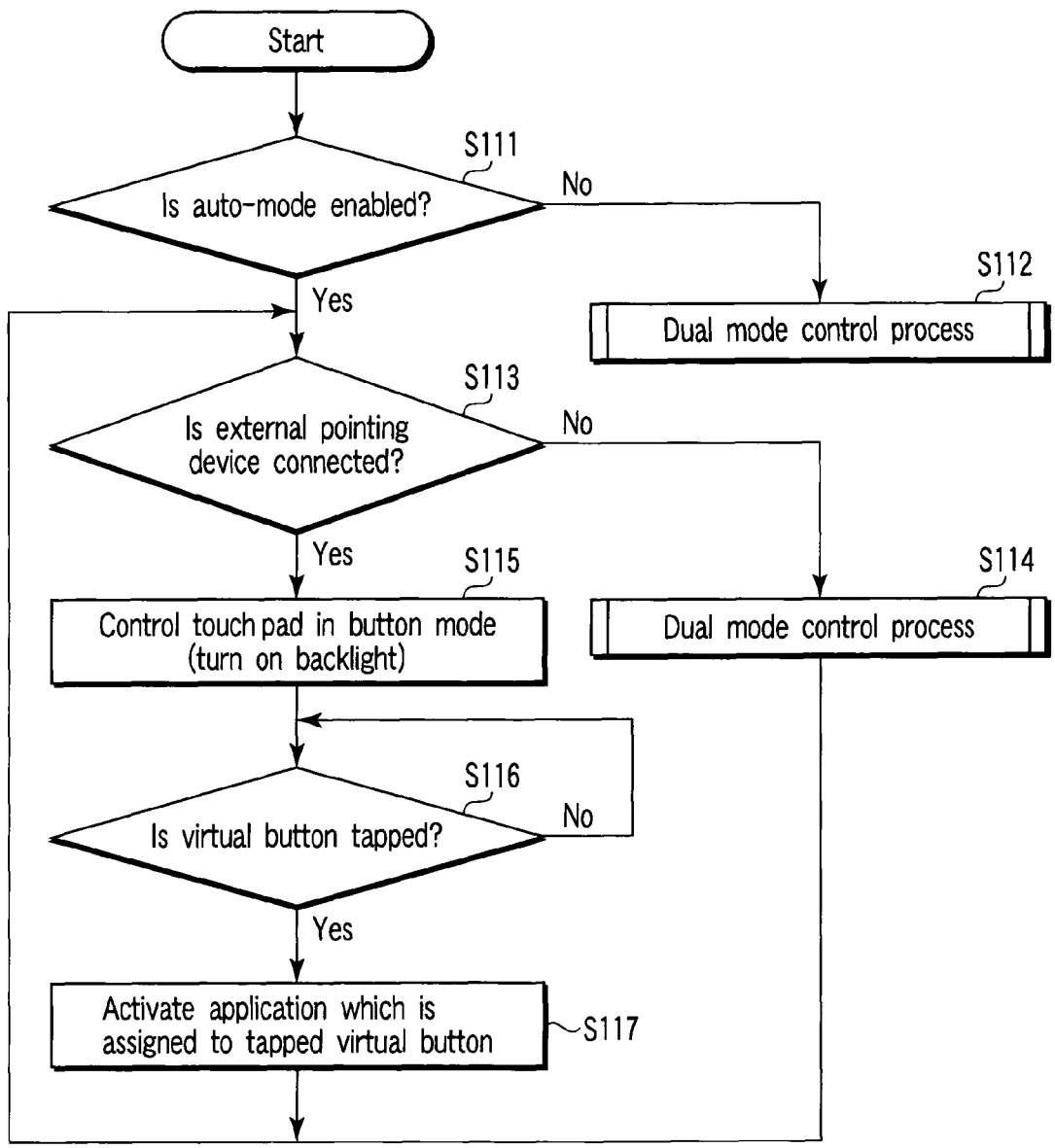
FIG. 8 is an exemplary flow chart illustrating an example of the procedure of a process at a time when an auto-mode is effective, which is executed by the computer shown in FIG. 1.

Next, referring to a flow chart of FIG. 8, a description is given of an example of a process procedure which is executed by the touch pad driver 201 when the auto-mode is effective.

To start with, the touch pad driver 201 determines whether the auto-mode is effective (block S111). If the auto-mode is not effective (NO in block S111), the touch pad driver 201 executes the dual mode control process which has been described with reference to FIG. 7 (block S112).

If the auto-mode is effective (YES in block S111), the touch pad driver 201 cooperates with the OS 701 and determines whether the external pointing device 100 is connected to the computer main body 11 (block S113). If the external pointing device 100 is not connected to the computer main body 11 (NO in block S113), the touch pad driver 201 executes the dual mode control process which has been described with reference to FIG. 7 (block S114). In block S114, the touch pad driver 201 first controls the touch pad 15 in the first mode (cursor mode). If the mode switch button 401 is tapped, the touch pad driver 201 controls the touch pad 15 in the second mode. If an arbitrary virtual button is tapped, the touch pad driver 201 activates the function corresponding to the tapped virtual button, and then switches the control mode of the touch pad 15 to the first mode (cursor mode), thus controlling the touch pad 15 in the first mode (cursor mode).

If the external pointing device 100 is connected to the computer main body 11 (YES in block S113), the touch pad driver 201 sends to the touch pad 15 a command for instructing turn-on of the backlight 151, thus turning on the backlight 151, and switches the control mode of the touch pad 15 to the second mode (button mode), thus controlling the touch pad 15 in the second mode (button mode) (block S115). If one of the virtual buttons 301 to 306 and 402 is tapped (YES in block S116), the touch pad driver 201 cooperates with the OS 701 and activates the function (e.g. application program) which is assigned to the tapped virtual button (block S117). Even after the function is activated, the control mode of the touch pad 15 is kept in the second mode (button mode). Using the external pointing device 100, the user can perform a pointing operation to designate an arbitrary position on the window of the activated application program.

If the external pointing device 100 is disconnected from the computer main body 11 in the second mode (NO in block S113), the touch pad driver 201 starts the dual mode control process (block S114).

As has been described above, in the present embodiment, the first mode (cursor mode) and the second mode (button mode) are basically used in an exclusive manner. Further, responding to the connection of the external pointing device 100 to the computer main body 11, the control mode of the touch pad 15 is automatically switched to the second mode (button mode). The user can perform the pointing operation by using the external pointing device 100, and at the same time the user can use the button function of the touch pad 15. Thus, the operability of the touch pad can sufficiently be improved without causing such a problem that an application corresponding to an arbitrary button is erroneously activated during the pointing operation by the user. Therefore, the operability of the touch pad can sufficiently be improved without causing an erroneous operation.

The layout of the virtual buttons on the surface of the touch pad 15 in the button mode is not limited to the example of FIG. 3. For example, layouts, as shown in FIG. 9, may be adopted.

Figure 9:
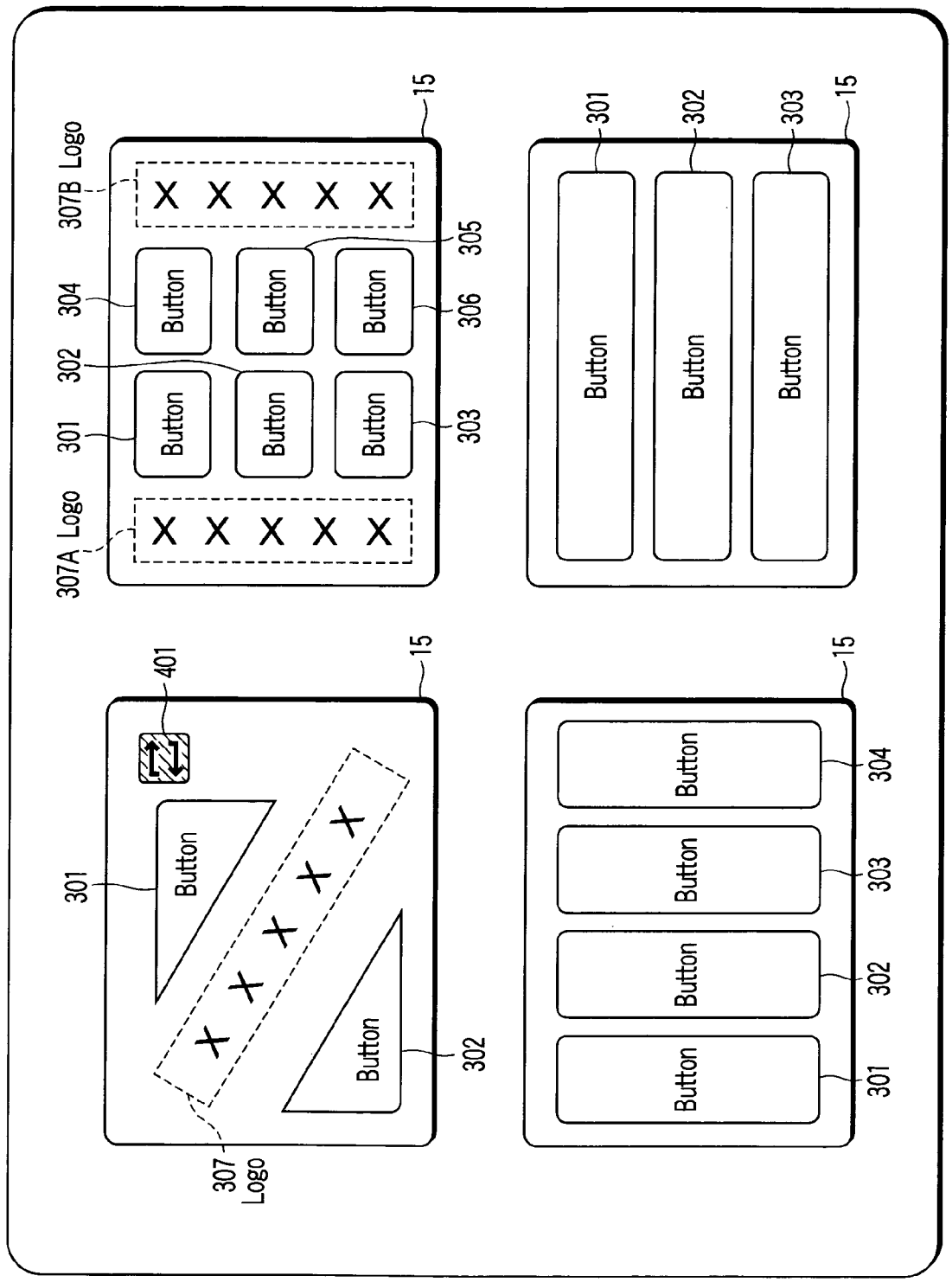
FIG. 9 shows examples of arrangement of virtual buttons on the touch pad provided on the computer shown in FIG. 1.

In an example of layout shown at an upper left part of FIG. 9, a logo 307 is disposed in an oblique direction from the upper left corner to the lower right corner on the surface of the touch panel 15. A triangular virtual button 301 is disposed on the upper side of the logo 307, and a triangular virtual button 302 is disposed on the lower side of the logo 307. A mode switch button 401 is disposed on an upper right corner part of the surface of the touch pad 15.

In an example of layout shown at a lower left part of FIG. 9, four virtual buttons having vertically elongated rectangular shapes are disposed on the surface of the touch pad 15.

In an example of layout shown at an upper right part of FIG. 9, a logo 307A and a log 307B are disposed on a left side and a right side of the surface of the touch pad 15, respectively. Six virtual buttons 301 to 306 are disposed on a central area between the logo 307A and logo 307B.

In an example of layout shown at a lower right part of FIG. 9, three virtual buttons having horizontally elongated rectangular shapes are disposed on the surface of the touch pad 15.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
  a main body;
  a touch pad, provided on the main body, including a surface sheet and a light source that is provided on a back side of the surface sheet, the surface sheet including a plurality of light-transmissive areas having shapes corresponding to a plurality of virtual buttons disposed on a surface of the touch pad and passing light which is emitted from the light source; and
  a control unit configured to control the touch pad in one of two modes,
  wherein a first mode is for making the touch pad to function as a pointing device and a second mode is for activating, in response to tapping of one of the plurality of virtual buttons, a function which is assigned to the tapped virtual button, the control unit turning off the light source in the first mode and turning on the light source in the second mode, the control unit controlling the touch pad in the second mode if an external pointing device is connected to the main body.

2. The information processing apparatus according to claim 1, further comprising a mode switch button, which instructs switching from the first mode to the second mode, is disposed on the surface of the touch pad, and
the control unit is configured to control the touch pad in the first mode if the external pointing device is not connected to the main body, and to control the touch pad in the second mode if the mode switch button is tapped in the first mode.

3. The information processing apparatus according to claim 1, further comprising a mode switch button, which instructs switching from the first mode to the second mode, is disposed on the surface of the touch pad, and
the control unit is configured to control the touch pad in the first mode if the external pointing device is not connected to the main body, to control the touch pad in the second mode if the mode switch button is tapped in the first mode, and to control, if one of the plurality of virtual buttons is tapped in the second mode, the touch pad in the first mode after a function corresponding to the tapped virtual button is executed.

4. The information processing apparatus according to claim 1, wherein the plurality of virtual buttons include first to third virtual buttons, which are disposed on an upper part of the surface of the touch pad and to each of which an application program or a file is assignable, and fourth to sixth virtual buttons, which are disposed on a lower part of the surface of the touch pad and to each of which an application program or a file is assignable.

5. The information processing apparatus according to claim 4, further comprising a logo that is disposed on the surface of the touch pad between the first to third virtual buttons and the fourth to sixth virtual buttons.

6. The information processing apparatus according to claim 4, further comprising a mode switch button, which instructs switching from the first mode to the second mode, is disposed on the surface of the touch pad.

7. The information processing apparatus according to claim 4, wherein the plurality of virtual buttons include a seventh virtual button to which a function of controlling a volume of sound is assigned.

8. A touch pad control method for controlling a touch pad which is provided on an information processing apparatus, comprising:
determining whether an external pointing device is connected to the information processing apparatus; and
controlling the touch pad in one of either two modes wherein a first mode is for making the touch pad to function as a pointing device and a second mode, in which in response to tapping of one of a plurality of virtual buttons disposed on a surface of the touch pad, a function which is assigned to the tapped virtual button is activated, said controlling including controlling the touch pad in the second mode if the external pointing device is connected to the information processing apparatus,
wherein the touch pad includes a surface sheet and a light source which is provided on a back side of the surface sheet, the surface sheet having a plurality of light-transmissive areas which have shapes corresponding to the plurality of virtual buttons and pass light which is emitted from the light source, and
said controlling includes turning off the light source in the first mode and turning on the light source in the second mode.

9. The touch pad control method according to claim 8, further comprising a mode switch button, which instructs switching from the first mode to the second mode, is disposed on the surface of the touch pad, and
said controlling includes controlling the touch pad in the first mode if the external pointing device is not connected to the information processing apparatus, and controlling the touch pad in the second mode if the mode switch button is tapped in the first mode.

10. The touch pad control method according to claim 8, further comprising a mode switch button, which instructs switching from the first mode to the second mode, is disposed on the surface of the touch pad, and
said controlling includes controlling the touch pad in the first mode if the external pointing device is not connected to the information processing apparatus, controlling the touch pad in the second mode if the mode switch button is tapped in the first mode, and controlling, if one of the plurality of virtual buttons is tapped in the second mode, the touch pad in the first mode after a function corresponding to the tapped virtual button is executed.

* * * * *